United States Patent [19]

Whittington et al.

[11] Patent Number: 4,470,789
[45] Date of Patent: Sep. 11, 1984

[54] EXTRUDER FOR FOAMED LIQUIDS

[75] Inventors: Edward J. Whittington, Portland; Boyd H. Hansen, Milwaukie; Charles N. Cone, Tigard, all of Oreg.

[73] Assignee: Pacific Adhesives Company, Inc., Portland, Oreg.

[21] Appl. No.: 419,221

[22] Filed: Sep. 17, 1982

[51] Int. Cl.³ .................... B29D 27/00; B05C 5/00
[52] U.S. Cl. .................... 425/192 R; 118/25; 118/209; 118/612; 264/50; 425/4 C; 425/464
[58] Field of Search .................... 264/54, 50; 118/25, 118/209, 315, 410, 411, 612; 425/192 R, 464, 4 C

[56] References Cited

U.S. PATENT DOCUMENTS

| | | | |
|---|---|---|---|
| 3,155,540 | 11/1964 | Loeffler et al. | 118/315 X |
| 3,190,259 | 6/1965 | Craig et al. | 118/411 X |
| 3,227,136 | 1/1966 | Bartlett et al. | 118/410 |
| 3,277,868 | 10/1966 | Lockwood et al. | 118/410 |
| 3,286,689 | 11/1966 | Ziemba | 118/411 |
| 3,479,989 | 11/1969 | Hunter et al. | 118/410 X |
| 3,602,193 | 8/1971 | Adams et al. | 118/315 |
| 3,690,800 | 9/1972 | Schwab et al. | 425/192 R |
| 3,814,628 | 6/1974 | Larkin | 118/410 X |
| 3,832,427 | 8/1974 | Mutch | 264/54 X |
| 3,865,078 | 2/1975 | DeHowitt et al. | 118/411 X |
| 3,865,535 | 2/1975 | Langdon et al. | 425/464 |
| 3,905,329 | 9/1975 | Cone et al. | 118/411 X |
| 3,965,860 | 6/1976 | Cone et al. | 118/315 X |
| 4,017,240 | 4/1977 | Nelson | 425/192 R |
| 4,113,152 | 9/1978 | Schmidt | 118/411 X |
| 4,159,355 | 6/1979 | Kaufman | 118/410 X |

Primary Examiner—Philip E. Anderson
Attorney, Agent, or Firm—Oliver D. Olson

[57] ABSTRACT

An extruder for delivering foamed glue from a foamer selectively to a plurality of spaced apart outlet orifices for extrusion onto a substrate surface and to bypass passageways for diverting the foamed glue to a defoamer for subsequent return to the foamer, is formed of three elongated flat blocks secured together releasably in face-abutting relationship. The surfaces of the outer, inlet and bypass blocks facing the center coupling block are recessed to provide a plurality of passageways all of which extend substantially equal distances from inlet and bypass ports in the inlet and bypass blocks, respectively, to a plurality of coupling ports in the coupling block. An air pressure operated selector valve in the bypass block is operable to communicate the coupling ports selectively with the bypass passageways for bypassing foamed glue to the defoamer and with the outlet orifices for extruding foamed onto a substrate surface.

10 Claims, 10 Drawing Figures

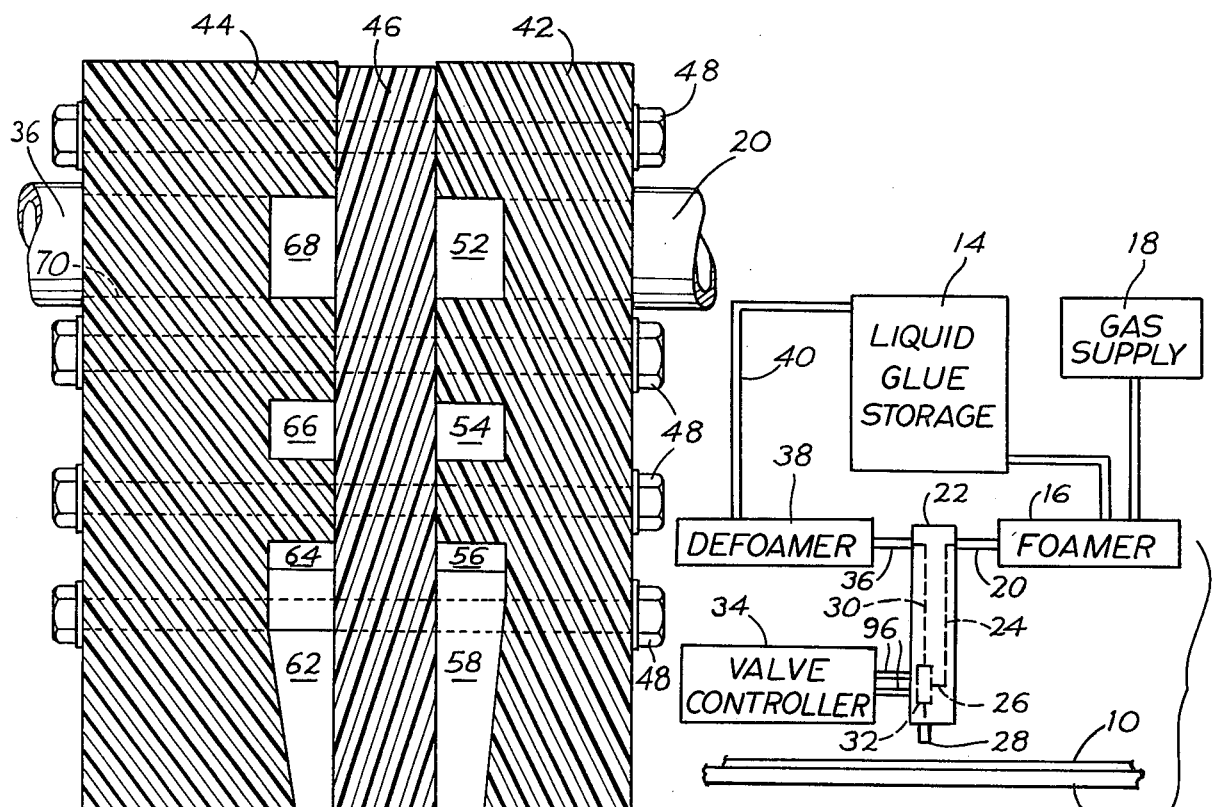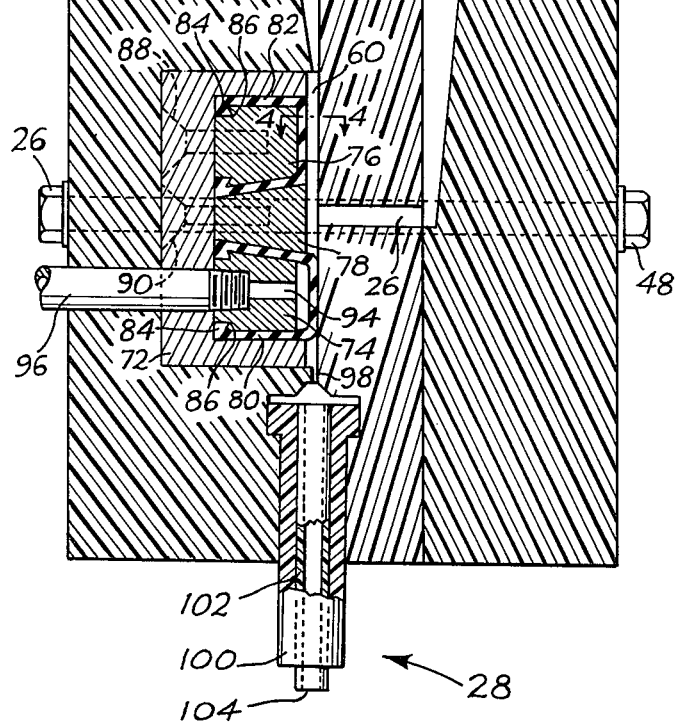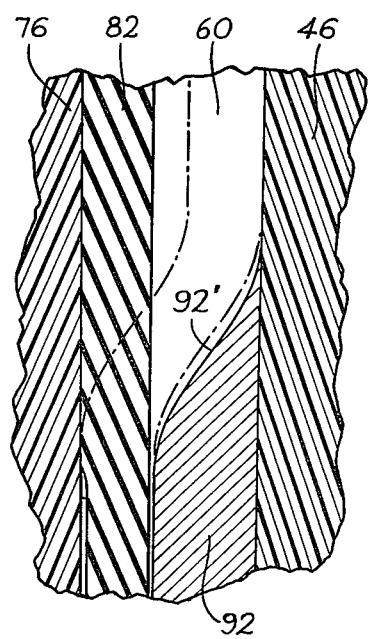
FIG. 5
FIG. 4

EXTRUDER FOR FOAMED LIQUIDS

BACKGROUND OF THE INVENTION

This invention relates to foamed liquids, and more particularly to an extruder by which foamed glue selectively is delivered to an elongated orifice assembly for extrusion onto a substrate surface, or is bypassed to a defoamer for recycling when extrusion is not taking place.

U.S. Pat. No. 4,258,088 describes the desirability of maintaining constant pressure of foamed glue at an elongated extruder orifice, whether glue is being extruded or being bypassed to a defoamer for recycling during periods when extrusion is not occurring. This is achieved in the patent by coupling the output conduit of the foamer through a control valve selectively to a foam infeed conduit leading to the extruder nozzle, or to a foam bypass conduit leading to the defoamer, and dimensioning the foam infeed conduit and nozzle assembly, on the one hand, and the bypass conduit on the other hand, to have the same resistance to flow.

Related U.S. Pat. No. 3,965,860 discloses an elongated extruder in which a plurality of longitudinally spaced nozzles are supplied from a common elongated chamber coupled to a foam infeed conduit.

SUMMARY OF THE INVENTION

In its basic concept, the foamed liquid extruder of this invention incorporates in a unitary structure an elongated control valve assembly which functions in a foam extruding position of adjustment to couple an elongated outlet orifice assembly to the inner end of an elongated infeed passageway assembly made up of a plurality of passageways all of which extend substantially equal distances from the orifice assembly to a foam infeed conduit, and in a bypass position of adjustment to couple the inner end of the infeed passageway assembly to the inner end of a foam bypass passageway assembly preferably made up of a plurality of passageways all of which extend substantially equal distances from their inner ends to a foam bypass conduit.

It is the principal objective of this invention to provide a foamed liquid extruder which incorporates integrally therewith means for maintaining the pressure of foamed liquid constant along the entire length of the inlet of an elongated extruder orifice during liquid extrusion and liquid bypass.

Another object of this invention is to provide a foamed glue extruder of the class described which insures the extrusion of foam uniformly from the entire length of the outlet orifice assembly.

Still another object of this invention is the provision of a foamed glue extruder of the class described in which a minimum of foamed glue is retained in the outlet orifice assembly during the period of bypassing of foamed glues for recycling.

A further object of this invention is to provide a foamed glue extruder of the class described which is of simplified construction for economical manufacture, which is capable of being disassembled for cleaning with speed and facility and which requires minimum maintenance and repair.

A still further object of this invention is to provide a foamed glue extruder of the class described which may be incorporated into a variety of types of systems involving the application of foamed glues to various types of substrates.

Another object of this invention is to provide a foamed glue extruder of the class described in which the outfeed through a laterally elongated outlet orifice assembly is controlled by a novel valve construction.

The foregoing and other objects and advantages of this invention will appear from the following detailed description, taken in connection with the accompanying drawings of preferred embodiments.

BRIEF DESCRIPTION OF THE DRAWINGS

FIG. 1 is a transverse sectional view of an extruder embodying the features of this invention.

FIG. 2 is a fragmentary vertical elevation as viewed toward the left in FIG. 1 through the left hand and center block of the assembly.

FIG. 3 is a fragmentary plan view of the right hand block of FIG. 1 rotated 90° clockwise from the position of FIG. 1.

FIG. 4 is a fragmentary sectional view, on an enlarged scale, taken on the line 4—4 in FIG. 1 illustraing a manner of sealing the ends of the control valve assembly.

FIG. 8 is a fragmentary bottom plan view of the outlet orifice as viewed from the bottom in FIG. 6.

FIG. 9 is a fragmentary sectional view taken on the line 9—9 in FIG. 6 illustrating a manner of sealing the ends of the control valve of FIG. 6.

FIG. 10 is a schematic representation of a system for applying foamed glue to a substrate moving intermittently along a production line under the extruder of FIG. 6.

DESCRIPTION OF THE PREFERRED EMBODIMENTS

Figure 5:
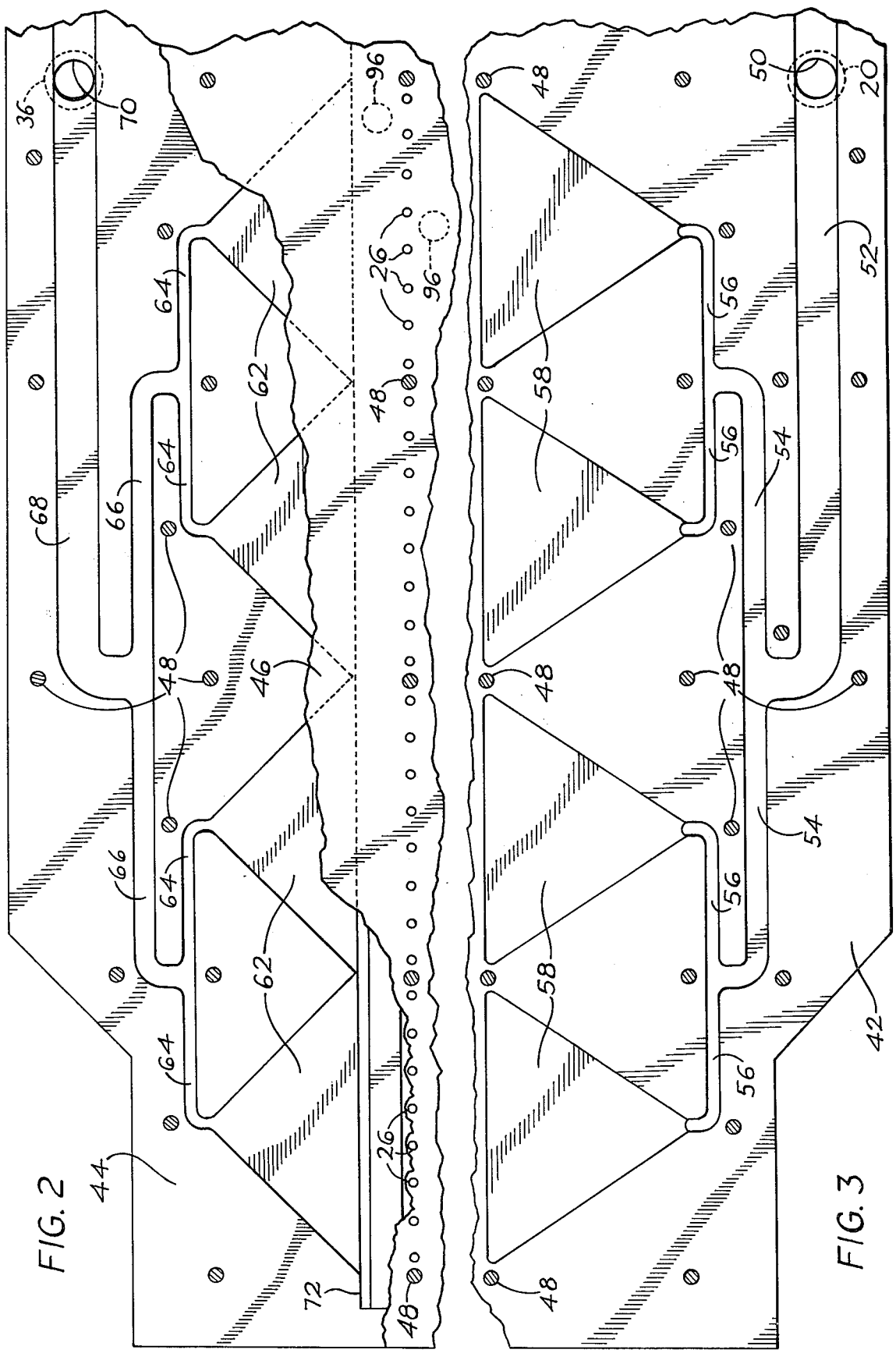
FIG. 5 is a schematic representation of a system for applying foamed glue to a substrate movable intermittently along a production line.

Referring first to FIG. 5 of the drawings, there is shown a substrate 10 supported on an intermittently movable conveyor 12. Although the illustrated system has particular utility in the application of foamed glue to veneers in the production of plywood, it will be understood that it is applicable to the distribution of various foamed liquids over the surfaces of a wide variety of types of substrates.

FIG. 5 also illustrates a reservoir 14 for storing liquid glue for delivery, as by means of a constant volume flow pump (not shown) through a conduit to a liquid glue foamer 16. Air, nitrogen, or other gas under pressure also is delivered to the foamer from a suitable source 18 of supply. Foamed glue produced at the foamer is delivered through conduit 20 to the extruder 22 of this invention.

Conduit 20 communicates with the outer end of an infeed passageway assembly 24 for delivery of foamed glue from its inner end through a multiplicity of coupling ports 26 either to an outlet orifice assembly 28 or to a bypass passageway assembly 30. This selection is afforded by a selector valve 32 actuated by a controller 34. Foamed glue delivered through the orifice assembly is deposited upon a substrate only during those periods of time of movement of the substrate. When the substrate conveyor is stopped, the controller actuates the selector valve to divert the foamed glue to the bypass passageway assembly from which it is returned through bypass conduit 36 to a defoamer 38 and thence through return conduit 40 to the storage reservoir 14.

In FIG. 1 the extruder 22 is shown to include three elongated flat blocks; namely, infeed block 42, bypass block 44 and central coupling block 46. These blocks are secured together detachably in face-abutting relationship by means of bolts 48.

The inner surface of infeed block 42 is recessed to form an infeed passageway assembly 24 of a plurality of passageways. In accordance with this invention, all of these passageways extend substantially equal distances from the connection of the foam inlet conduit 20 to the coupling port 26 in the center block 46. Thus, as best shown in FIG. 3, the inlet conduit is coupled to an infeed port 50 which communicates with the central point of an elongated main passageway 52. Each of the opposite outer ends of this main passageway communicates with the central point of a secondary passageway 54. Each of the opposite outer ends of each secondary passageway communicates with the inner end of a tertiary passageway 56. Finally, each of the opposite outer ends of each tertiary passageway communicates with the inner of a distribution passageway 58.

Each distribution passageway 58 is tringular in plan view (FIG. 3). Although each passageway 58 may be of uniform dimension in transverse section, it preferably is triangular, as shown in FIG. 1. In this form it is also of maximum width, in transverse section, at its inner end, tapering to narrower width in transverse section at its outer end where it communicates with a plurality of the coupling ports 26 in the center block 46. For this purpose the distribution passageway is of maximum width in plan at its outer end, tapering to narrower width at its inner end. These dimensions preferably are chosen so that the longitudinal cross-sectional area of the distribution passageway remains substantially constant from the outer end to the inner end. It is by this means that there is achieved substantially uniform delivery of foamed glue through all of the coupling ports 26.

The ends of the coupling ports 26 opposite the distribution passageway 58 communicate with longitudinally elongated valve chamber 60. This chamber is formed as a recess in the surface of bypass block 44 facing the central block 46. The upper end of the valve chamber communicates with the wide inner ends of collector passageways 62. These collector passageways are constructed in the manner of the distribution passageway 58, but function to receive bypassed foamed glue for return to the reservoir 14, preferably through defoamer 38.

In the manner of the distribution passageways 58, the inner ends of adjacent pairs of collector passageways 62 are connected to the opposite ends of tertiary bypass passageways 64. Communicating with the central point of adjacent pairs of tertiary bypass passageways 64 are the opposite ends of secondary bypass passageways 66. Similarly, communicating with the central point of adjacent pairs of secondary bypass passageways are the opposite ends of a main bypass passageway 68. The central point of the main bypass passageway communicates with bypass port 70 which connects with bypass conduit 36.

Valve chamber 60 contains elongated, C-shaped valve body 72 which is secured removably therein by means of bolts (not shown) extended through openings in the bypass block 44. Within the cavity of the valve body are three elongated, parallel clamp bars 74, 76 and 78. These clamp bars are of trapezoidal shape in cross section, the central bar 78 having its shorter side facing away from the center block 46 and the outer bars 74 and 76 having their shorter sides facing the center block.

The outer bars 74 and 76 mount elongated, C-shaped valve members 80 and 82, respectively, These valve members are made of rubber or other suitably elastic material. Each has inwardly angles, longitudinally elongated lugs 84 on their terminal edges arranged to engage elongated notches 86 on the outward edges of the clamp bars.

The outer clamp bars are secured to the valve body 72 by means of bolts 88, and the central bar 78 is secured between the outer bars by bolts 90. The central bar thus wedges between the outer bars and clamps the inner sides of the valve members 80 and 82 between them. The outer sides of the valve members are clamped between the bars and the confronting inner sides of the legs of the C-shaped body 72.

The opposite ends of the valve members 80 and 82 are sealed against the escape of foamed glue from the chamber 60 by means of closure bars 92 (FIG. 4). These closure bars are interposed between the valve members and the central block 46. They are provided with smoothly contoured inner ends 92' which allow flexing of the elastic valve members with minimum fatigue. The valve members thus are afforded a long operating life.

The central portion of each valve member 80 and 82 is interposed between the inwardly facing side of the associated clamp bars 74 and 76, respectively, and the inner portion of the valve chamber 60 defined by the confronting surface of the central block 46. Each of the bars is provided with a transverse port 94 which is connected to a conduit 96 extending outwardly through the bypass block 44 for connection to the controller 34 (FIG. 5).

The controller includes a source of fluid under pressure, preferably air pressure, and a selector valve by which air pressure is delivered selectively to the valve members 80 and 82. FIG. 1 illustrates the condition in which air under pressure is delivered to valve member 80 to extend its central portion into sealing contact with the confronting surface of central block 46. Coupling ports 26 thus are communicated through valve chamber 60 and past retracted valve member 82 to the collector passageways 62.

The valve chamber 60 on the side of valve member 80 opposite the coupling port 26 communicates with outlet orifice assembly 28 through outfeed passageway 98. In the embodiment illustrated, this assembly includes an elongated orifice block 100 provided with a multiplicity of longitudinally spaced apart orifices 102. As illustrated, these orifices are fitted with tubular orifice inserts 104 which project outwardly beyond the outer side of the block 100 to produce discrete extrusions of foamed glue. Without these inserts, or other means providing separated nozzles, foamed glue extruded through the orifices 102 tends to creep along the outer side of the block 100 and join together, forming irregularly spaced and sized clusters of foamed glue extrusions.

To illustrate the operation of the extruder described hereinbefore, let it be assumed that the system of FIG. 5 is being employed to apply foamed glue to veneer sheets 10 moving intermittently on controlled conveyor 12, in the production of plywood.

Liquid glue in storage reservoir 14 is delivered to the foamer 16, and the foamed glue outfeed is delivered through conduit 20 to the infeed port 50 and thence to the main infeed passageway 52. The foamed glue passes along the infeed passageway 52 in both directions from the port 50, and thence into the secondary passageways 54. These passageways are about one-half the cross sectional area of the main infeed passageway 52, and therefore they accept the glue with no substantial increase or decrease in pressure or volume flow.

At the opposite ends of the secondary passageways 54 the glue enters the tertiary infeed passageways 56. These also are about one-half the cross sectional area of the secondary infeed passageway 54, and therefore the glue progresses through them with no substantial decrease or increase in pressure or volume flow.

From each end of each of the tertiary infeed passageways 56 the foamed glue enters the narrow inner end of the associated distribution passageway 58 and progresses with substantially no change in pressure or volume flow toward the wide outer end and thence into the associated coupling ports 26.

Let it be assumed that the conveyor 12 is moving veneer 10 under the orifice assembly 28. Accordingly, the controller 34 operates to retract the valve member 80 and to extend the valve member 82 into sealing contact with the confronting surface of the coupling block 46. The chamber 60 thus is closed against the flow of foamed glue toward the bypass collector passageways 62. With valve member 80 retracted, foamed glue flows past it in chamber 60 and into the outlet orifice inserts 104, exiting the outer ends thereof in discreet, spaced apart strings of foamed glue. These strings of foamed glue gravitate downward onto the veneer 10 passing underneath.

Let it now be assumed that conveyor 12 is stopped temporarily, correspondingly stopping movement of the veneer 10 upon it. Accordingly, the controller 34 is operated to retract the valve member 82 and to extend valve member 80 into sealing contact with the coupling block 46. Foamed glue thus is prevented from continuing to flow into the outlet orifice assembly.

In this latter regard, it is to be noted from FIG. 1 of the drawings that the amount of foamed glue retained in the outlet orifice assembly while valve member 80 is closed, is very small. This results from the positioning of the valve member 80 closely adjacent the outlet orifice assembly. This insures that upon resumption of outfeed of foamed glue, there is substantially no change in the physical properties of the glue exiting the outlet orifice assembly. Additionally, it simplifies the cleaning of the extruder assembly by minimizing the length of passageway leading to the outlet orifice assembly.

The outlet orifice assembly may be removed from its mounting between the bypass block 44 and coupling block 46 by unloosening the bolts 48 and spreading the blocks 44 and 46 apart sufficiently to effect disengagement of the outlet orifice block 100.

The controller 34 having extended the valve member 80 and retracted the valve member 82, foamed glue passing through the coupling ports 26 now is diverted through the passageway 60 past the retracted valve member 82 and into the adjacent wide ends of the bypass collector passageways 62. The foamed glue progresses upward through these passageways, with substantially no change in pressure or volume flow, thence into the tertiary bypass passageways 64 and into the secondary bypass passageways 66 to the main bypass passageway 68. As in the manner of the inlet passageways previously described, the cross sectional areas of these various bypass passageways are such as to afford passage of the foamed glue therethrough with substantially no increase or decrease in pressure or volume flow. Accordingly, upon switching of the valve members to resume outward feeding of foamed glue through the outlet orifice assembly, the physical character and volume flow of foamed glue from the outlet remains substantially unchanged.

As previously described, bypassed foamed glue passes from the main bypass passageway 68 through the bypass port 70 and into bypass conduit 36 from whence it is returned to the storage reservoir 14, preferably through the defoamer 38.

Referring now to the embodiment of FIGS. 6–10, the extruder 106 is shown to include three elongated flat blocks; namely, infeed block 108, bypass block 110 and central coupling block 112. These blocks are secured together detachably in face-abutting relationship by means of bolts 114.

Figure 6:
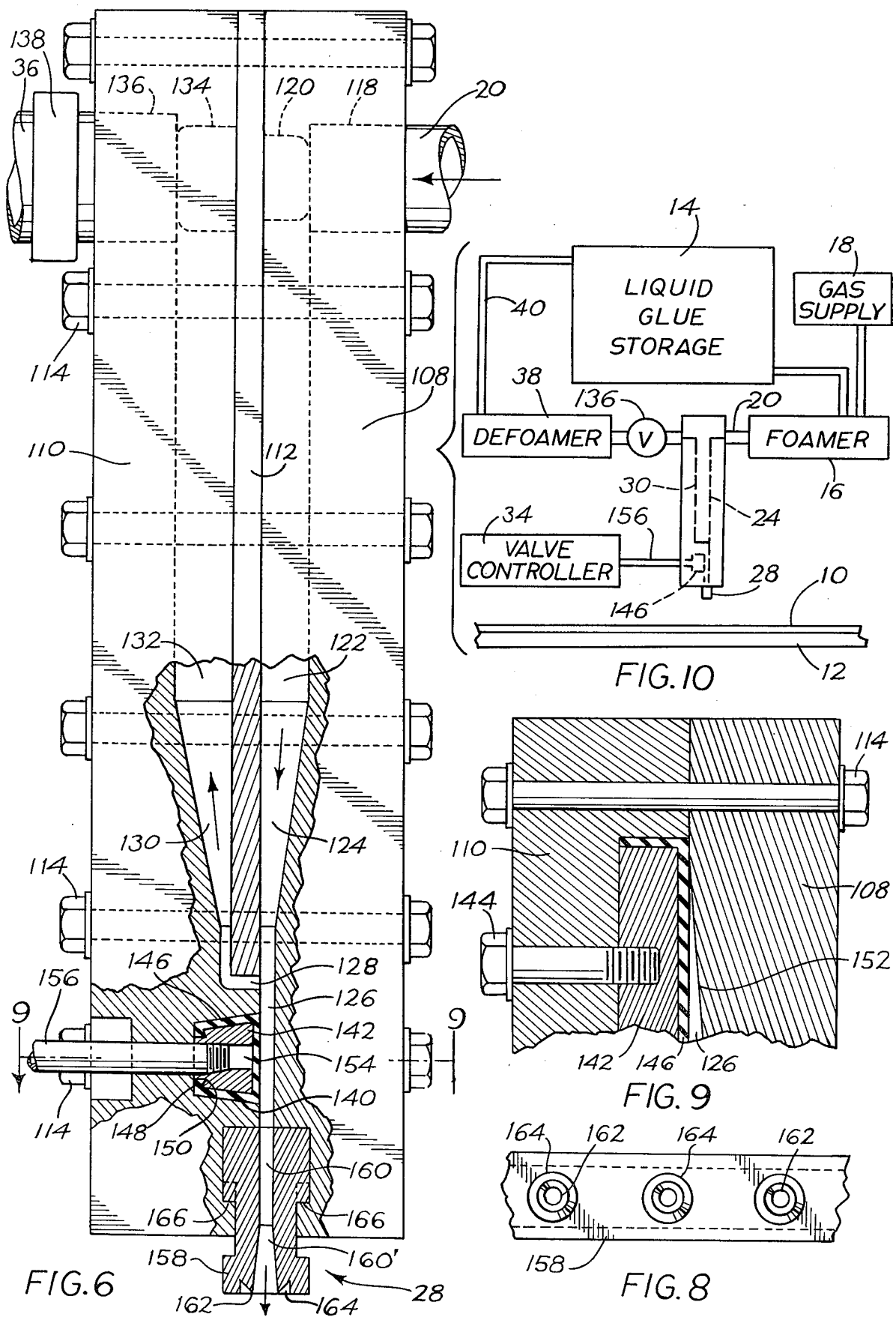
FIG. 6 is a transverse sectional view of a second form of extruder embodying the features of this invention.
Figure 7:
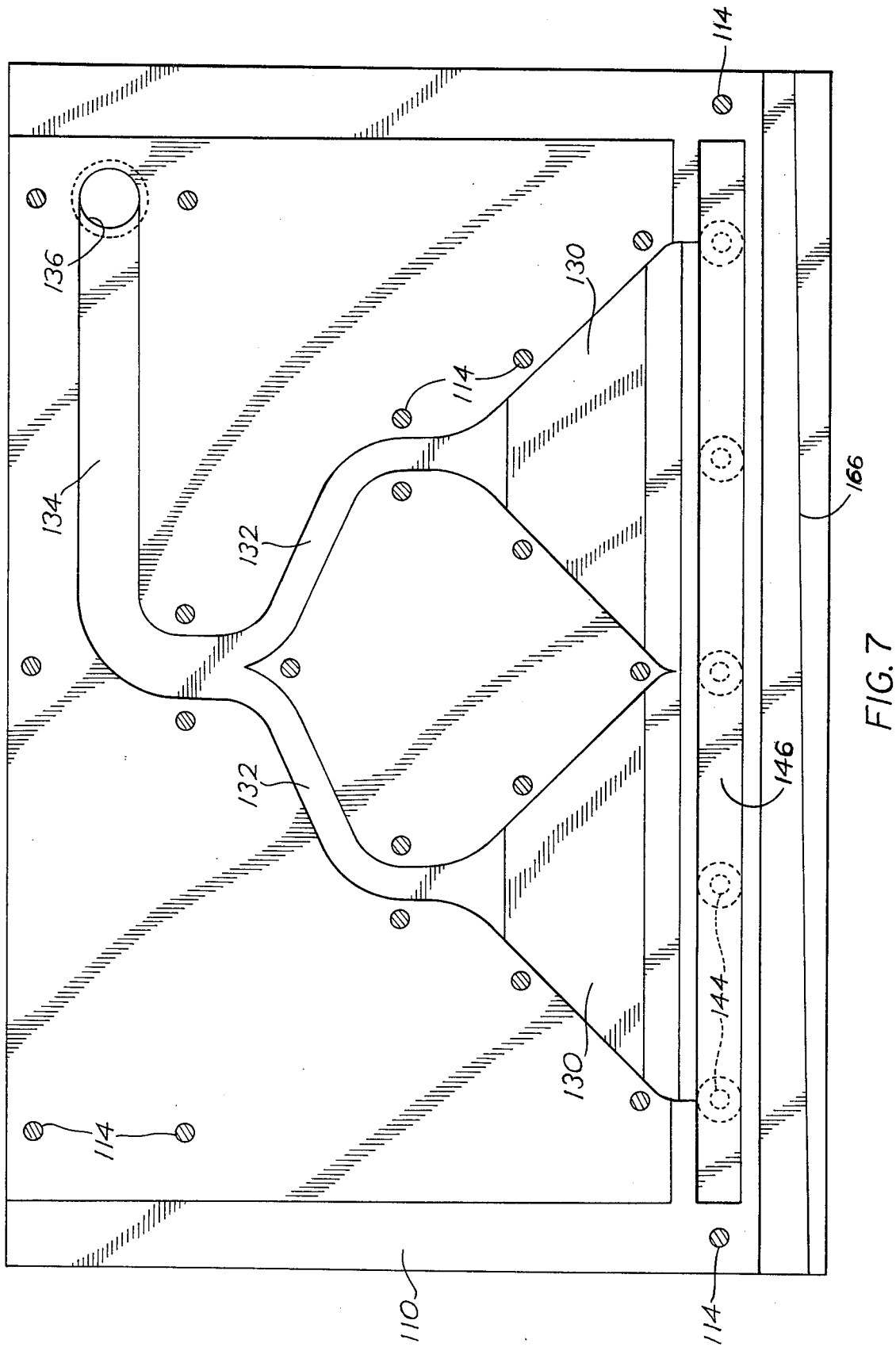
FIG. 7 is a vertical elevation as viewed toward the left in FIG. 6 through the left hand block of the assembly.

The inner surface of infeed block 108 is recessed to form an infeed passageway assembly 24 of a plurality of passageways. As in the first embodiment described, all of these passageways extend substantially equal distances from the connection of the foam inlet conduit 20 to the outlet orifice assembly 28. Thus, as best shown in FIG. 6, the inlet conduit is coupled to an infeed port 118 which communicates with an elongated main passageway 120. The opposite outer end of this main passageway communicates with the central point of a secondary passageway 122. Each of the opposite outer ends of the secondary passageway communicates with the inner end of a distribution passageway 124.

As in the first embodiment described, each distribution passageway 124 is triangular in plan view as well as in transverse section. It is also of maximum width, in transverse section, at its inner end, tapering to narrower width in transverse section at its outer end where it is of maximum width in plan.

In place of the coupling ports 26, the outer ends of the distribution passageways 124 communicate with longitudinally and laterally elongated slot 126. This slot is formed as a recess in the surface of infeed block 108. Its upper portion faces the lower portion of central block 112 and its lower portion faces the confronting surface of bypass block 110. The upper portion of slot 126 communicates with a transverse slot 128 which is formed between the bottom end of central block 112 and the upper end of an inner extension of the bypass block 110. The slot communicates with the wide inner ends of collector passageways 130. These collector passageways are constructed in the manner of the distribution passageways 124, but function to receive bypassed foamed glue for return to the reservoir 14, preferably through defoamer 38.

In the manner of the distribution passageways 124, the inner ends of the pair of collector passageways 130 are connected to the opposite ends of secondary bypass passageway 132 the central point of which communicates with the inner end of main bypass passageway 134. The outer end of this passageway communicates with bypass port 136 which connects with bypass conduit 36 through control valve 138.

Within an elongated valve chamber 140 in the inner side of bypass block 110 is an elongated clamp bar 142.

It is of trapezoidal shape in cross section, having its shorter side facing away from the slot 126. It is secured removably in the valve chamber by bolts 144.

The clamp bar 142 mounts an elongated, C-shaped valve member 146. It is made of rubber or other suitably elastic material and has inwardly angled, longitudinally elongated lugs 148 on its terminal edges arranged to engage elongated notches 150 on the outward edges of the clamp bar 142.

The opposite ends of the valve member 146 are sealed against the escape of foamed glue by sealing engagement with the confronting surfaces of the opposite end portions of the infeed block 108 (FIG. 9). Tapered grooves 152 in the infeed block inwardly of the said end portions communicate with the slot 126 to allow flexing of the elastic valve member with minimum fatigue. The valve member thus is afforded a long operating life.

The central portion of the valve member 146 confronts the slot 126. The supporting clamp bar 142 is provided with a transverse port 154 which is connected to a conduit 156 extending outwardly through the bypass block 110 for connection to the controller 34 (FIG. 10).

The controller includes a source of fluid under pressure, preferably air pressure, and a control valve by which air pressure is delivered selectively to the valve member 146. FIG. 6 illustrates the condition in which air pressure has been relieved from the valve member to retract its central portion from the slot 126.

The lower end of slot 126 communicates directly with outlet orifice assembly 28. In the embodiment illustrated in FIGS. 6 and 8, this outlet orifice assembly includes an elongated orifice block 158 provided with a multiplicity of longitudinally spaced apart orifices 160. As illustrated, the outer portion 160' of each of these orifices is flared outwardly to larger diameter. The degree of flare may be varied to achieve the desired velocity and diameter of foamed extrusion. Each orifice terminates in an isolated edge 162 defined by a counterbore 164 recessed into the block surrounding said edge. These spaced edges 162 produce discrete extrusions of foamed glue, in the manner of the inserts 104 previously described.

Tapered grooves 166 in the confronting sides of the infeed block 108 and bypass block 110 form a channel for the removable reception of the orifice block 158. The latter is provided with correspondingly sloped shoulders, whereby the block is wedged into sealing position but may be removed by slipping it laterally outward from the larger end of the groove.

From the foregoing it will be appreciated that the present invention provides a foamed liquid extruder which is of simplified construction, affording economical manufacture, maintenance and repair and which assures that the extrusion of foamed liquid is of uniform character and volume flow throughout the entire length of the outlet orifice assembly.

It will be apparent to those skilled in the art that various changes may be made in the size, shape, type, number and arrangement of parts described hereinbefore. For example, the outfeed passageway 98 in FIG. 1 may be formed in infeed block 42, as in FIG. 6, and the feed control valve 80 mounted in the infeed block for association therewith, with bypass control valve 82 retained in the position shown, for association with bypass passageways 62. In such event, each valve preferably is constructed in the manner of valve 146 (FIG. 6). A similar arrangement may be used in the embodiment of FIG. 6, i.e. valve 146 mounted in infeed block 108 and a similar valve mounted in bypass block 110 for association with the vertical section of slot 128. Such an arrangement eliminates the control valve 138 and controls the foam bypass closer to the feed slot 126. These and other modifications may be made, as desired, without departing from the spirit of this invention and the scope of the appended claims.

Having now described our invention and the manner in which it may be used, We claim:

1. An extruder for foamed liquid, comprising:
    (a) an elongated extruder body including an elongated flat infeed block, an elongated flat bypass block, an elongated flat coupling block interposed between the infeed and bypass blocks, and means detachably securing said blocks together in face-abutting relationship,
    (b) a foamed liquid inlet opening in the infeed block,
    (c) infeed passageway means formed in the surface of the infeed block confronting the coupling block and having an inlet end communicating with the infeed opening,
    (d) a foamed liquid bypass opening in the bypass block,
    (e) bypass passageway means in the surface of the bypass block confronting the coupling block and having an outlet end communicating with the bypass opening,
    (f) coupling passageway means formed by the coupling block and communicating the outfeed end of the infeed passageway means with the infeed end of the bypass passageway means,
    (g) an elongated outfeed block mounted removably on the body and having therein elongated foamed liquid outfeed passageway means arranged to communicate with the outfeed end of the infeed passageway means, and
    (h) elongated valve means in the body operative in one position of the adjustment to open the outfeed passageway means to the infeed passageway means to afford outfeeding of foamed liquid, and operable in a second position of adjustment to seal the outfeed passageway means from the infeed passageway means to afford bypassing foamed liquid to the bypass opening.

2. The extruder of claim 1 wherein the outfeed passageway means includes a multiplicity of laterally spaced openings each terminating at its outfeed end in an isolated edge surrounded by a recess.

3. The extruder of claim 1 wherein the valve means includes a pair of longitudinally extending resilient valve members spaced apart on opposite sides of the coupling passageway means and operable to seal the bypass passageway means and outfeed passageway means selectively on opposite sides of the coupling passageway means for directing the flow of foamed liquid selectively to the outfeed passageway means and to the bypass passageway means.

4. The extruder of claim 3 including fluid pressure delivery means communicating with each resilient valve member for moving the latter to its sealing position.

5. The extruder of claim 1 wherein the valve means comprises a longitudinally extending resilient valve member positioned on the outfeed passageway side of the coupling passageway means and operable to seal and open the outfeed passageway means selectively for directing the flow of foamed liquid selectively to the bypass passageway means and to the outfeed passageway means, and bypass valve means is associated with the bypass opening for opening and closing the latter.

6. The extruder of claim 5 including fluid pressure delivery means communicating with the resilient valve member for moving the latter to its sealing position.

7. An extruder for foamed liquids, comprising:
 (a) a laterally elongated body,
 (b) a laterally elongated outfeed passageway in the body,
 (c) a laterally elongated outfeed valve chamber in the body communicating with the outfeed passageway,
 (d) an elongated resilient valve membrane in the outfeed valve chamber movable between a retracted position opening the outfeed passageway for the outfeeding of foamed liquid and an extended position closing the outfeed passageway, and
 (e) operator means associated with the membrane for moving the latter to said extended position.

8. The extruder of claim 7 wherein the operator means includes a source of fluid under pressure arranged for selective communication with the membrane.

9. The extruder of claim 7 including:
 (a) a laterally elongated bypass passageway in the body communicating with the outfeed passageway upstream from the outfeed valve chamber,
 (b) a laterally elongated bypass valve chamber in the body communicating with the bypass passageway,
 (c) an elongated resilient valve membrane in the bypass valve chamber movable between a retracted position opening the bypass passageway for the bypassing of foamed liquid and an extended position closing the bypass passageway, and
 (d) operator means associated with the membrane in the bypass valve chamber for moving said membrane to said extended position.

10. The extruder of claim 9 wherein the operator means includes a source of fluid under pressure arranged for selective communication with the membranes for moving each membrane selectively to said extended position.

* * * * *

UNITED STATES PATENT AND TRADEMARK OFFICE
CERTIFICATE OF CORRECTION

PATENT NO. : 4,470,789

DATED : 11 September 1984

INVENTOR(S) : Whittington et al

It is certified that error appears in the above-identified patent and that said Letters Patent are hereby corrected as shown below:

In the Abstract, last line, after "foamed" insert --liquids--.

In the Drawings, Sheet 1,

The drawing to the left of Figs. 4 and 5 should be identified as Fig. 1. (Apply to the Grant only)

Column 3, line 27, after "inner" insert --and--.

Column 3, line 28, "tringular" should read --triangular--.

Column 4, line 11, "angles" should read --angled--.

Signed and Sealed this

*Twenty-first* Day of *May 1985*

[SEAL]

*Attest:*

DONALD J. QUIGG

*Attesting Officer*      *Acting Commissioner of Patents and Trademarks*